April 6, 1954 H. FREEDMAN 2,674,241
REGULATING DEVICE FOR BUNSEN BURNERS
Filed Dec. 6, 1947 2 Sheets-Sheet 1

INVENTOR
HYMAN FREEDMAN
BY
ATTORNEY

April 6, 1954     H. FREEDMAN     2,674,241
REGULATING DEVICE FOR BUNSEN BURNERS
Filed Dec. 6, 1947     2 Sheets-Sheet 2
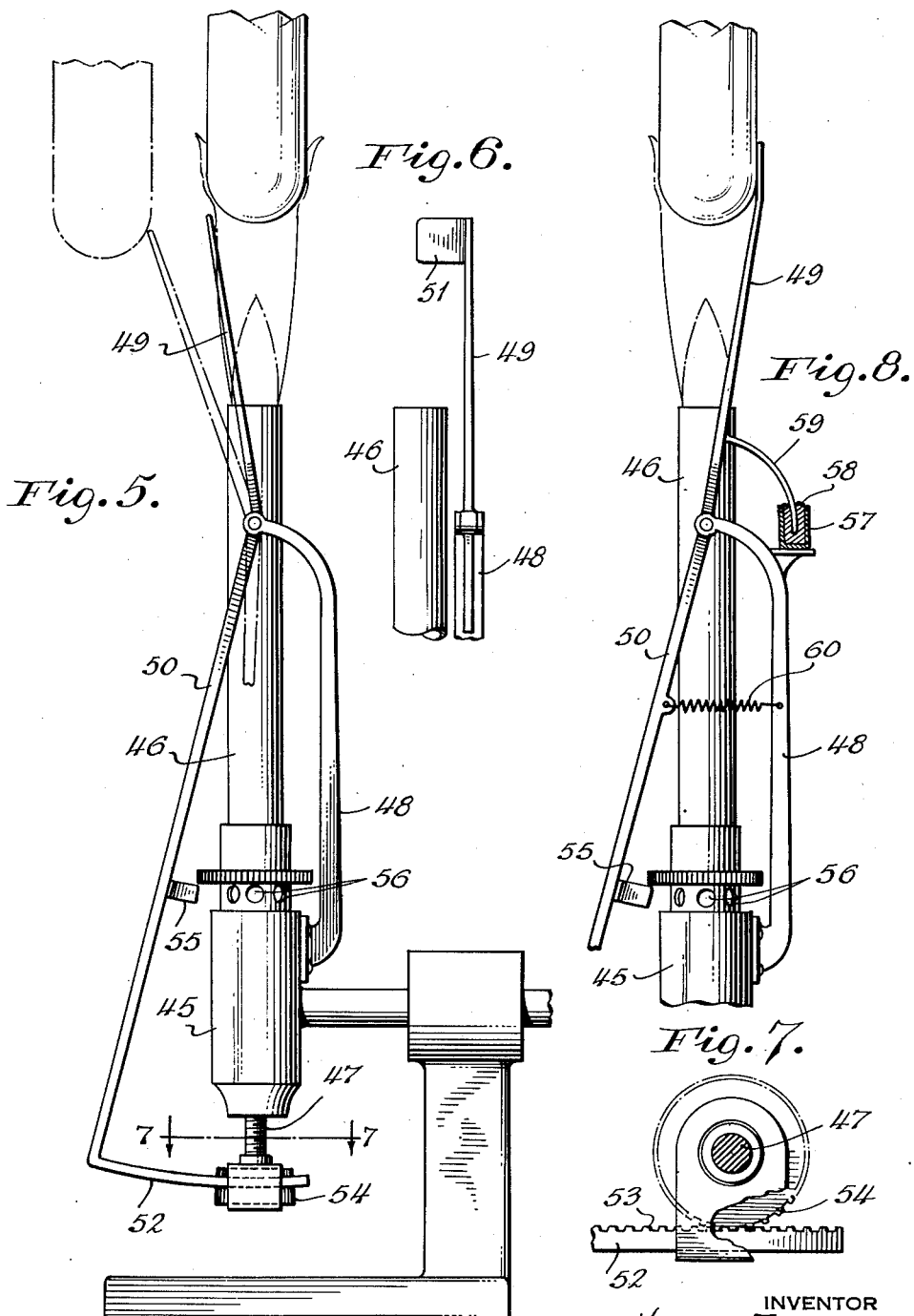
INVENTOR
HYMAN FREEDMAN
BY
ATTORNEY Patented Apr. 6, 1954

2,674,241

UNITED STATES PATENT OFFICE 2,674,241

REGULATING DEVICE FOR BUNSEN BURNERS

Hyman Freedman, New York, N. Y.

Application December 6, 1947, Serial No. 790,187

7 Claims. (Cl. 126—234)

This invention relates to improvements in Bunsen burners and has particular reference to a regulating device therefor.

An object of the invention is to provide a simple and efficient device of improved construction which will facilitate the adjustment of the control valve of a burner by utilizing an implement such as employed in dentistry, for example, to adjust said valve to open position while in the act of presenting said implement to the flame of the burner, and to close said valve when the implement is withdrawn.

The above and other objects will appear more clearly from the following detailed description when taken in connection with the accompanying drawings which illustrate preferred embodiments of the inventive idea.

In the drawings:

Fig. 5 is an elevation of a burner, showing another form of the invention applied thereto;

Fig. 6 is a fragmentary elevation taken at right angles to Fig. 5;

Fig. 7 is a transverse section on the line 7—7 of Fig. 5;

Fig. 8 is a fragmentary elevation, partly in section, of the form shown in Fig. 5, with a retaining means added for the valve actuating member.

Figure 1:
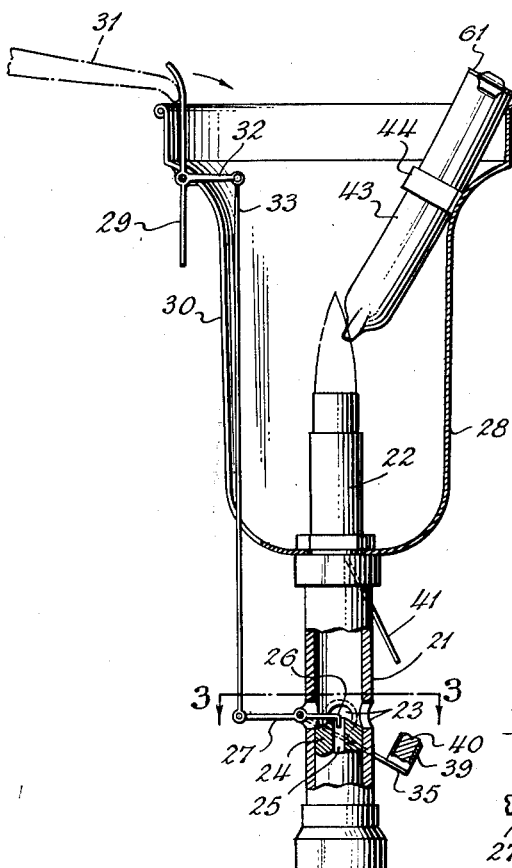
Fig. 1 is an elevation, partly in section, of a Bunsen burner showing one form of the invention applied thereto, and wherein the control valve and associated parts are in closing position.

Referring to the form of the invention shown in Figs. 1 to 4, a Bunsen burner of well known construction is generally indicated at 20 and is shown as comprising a mixing chamber 21 having the nozzle 22 extending therefrom. The chamber 21 is provided with intake openings 23, and in accordance with the present invention, a valve seat 24 is mounted contiguous to said openings and has a vent 25 through which gas passes into the chamber 21 from a source of supply to which the burner is connected. A needle valve 26 controls the vent 25 and is carried by an arm 27 which is pivoted to the wall of the chamber 21 and extends through one of the openings 23. When the valve 26 is in closing position, it partially closes the vent 25 so as to reduce the amount of gas entering the chamber 21 and thus produce a low flame at the nozzle mouth, and when said arm 27 is rocked about its pivot, as will presently appear, the valve is moved to open position (Fig. 2) to permit the free flow of gas into said chamber and thereby produce a high flame.

An enclosure 28 for the nozzle 22 is mounted thereon and the open upper end of said enclosure is located above the mouth of said nozzle. To operate the valve arm 27, an actuating member 29 is pivotally mounted in a vertical slot 30 formed in the wall of said enclosure, and said member 29 is positioned so that its upper end will extend above the rim of the enclosure whereby an implement 31, such as a dental instrument, may be engaged with said upper end to rock the member 29 inwardly while in the act of presenting said implement to the burner flame. It will also be apparent that the implement 31 may be utilized to reverse the movement of the actuating member 29 when withdrawing the implement from the flame. The initial movement of the member 29 and its reversal is designed to open and close the valve 26 and, for this purpose, the said member is provided with an extension 32 projecting through the slot 30 into the enclosure 28 and having connected thereto the upper end of a link 33, the lower extremity of which is pivotally joined to the arm 27 so as to rock said arm about its pivot when the member 29 is actuated in either direction.

Figure 2:
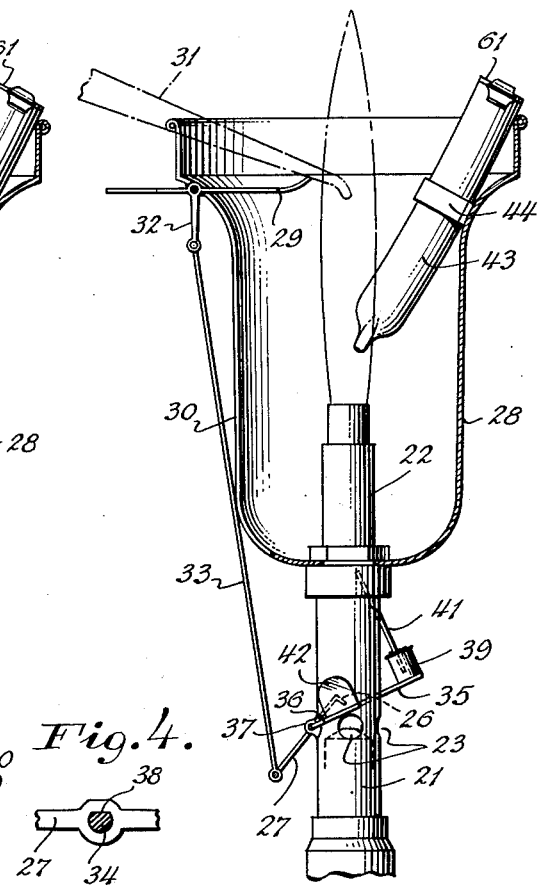
Fig. 2 is a similar view showing the parts in operated position to provide a high flame in the burner.
Figure 4:
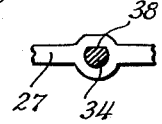
Fig. 4 is a similar section on the line 4—4 of Fig. 3.
Figure 3:
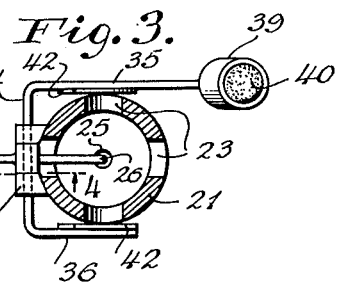
Fig. 3 is a transverse section on the line 3—3 of Fig. 1.
Figure 3:
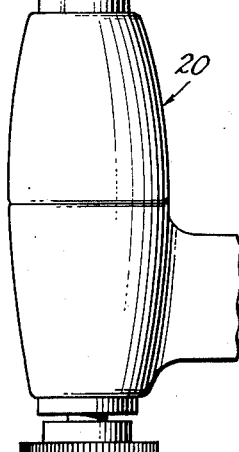

It is desirable, at times, to maintain the valve 26 in open position for a definite period of time after the implement 31 is withdrawn so that the implement may be reinserted and again heated in the high flame of the burner without the necessity of operating the member 29. For this purpose the invention provides a time delay device of any preferred form which is shown herein as comprising an angular frame having an intermediate portion 34 pivotally mounted in a bearing 37 supported on the exterior of the mixing chamber 21 in which the valve arm 27 is also mounted, and further having two arms 35 and 36 extending from said portion 34. The latter is flattened, as indicated at 38 (Fig. 4), where it extends through the valve arm 27 so that the arms 35, 36 will move with said valve arm 27 when it is actuated. At the free extremity of the arm 35 the same carries a small receptacle 39 adapted to contain an adhesive material 40 of any desired nature, such as wax, which will have the quality of softening when subjected to heat. Thermally mounted on the mixing chamber 21 so as to receive heat therefrom and from the enclosure 28 is a heat conducting element in the form of a rod 41, and the lower end of said element is so positioned that when the member 29 is actuated to open the valve 26, the frame of which the arm 35 forms a part will be swung upwardly to embed the lower end of said element 41 in the material 40 to an extent depending upon the degree of rocking movement of the member 29. Said material will then adhere to said element, as shown in Fig. 2, and prevent the return of said frame and the valve 26 to normal position when the implement 31 is withdrawn from the flame of the burner without reversing the movement of said actuating member 29. The parts will remain in said position for a definite period of time or until the heat generated by the high flame is conducted through the element 41 to the material 40 sufficiently to soften the latter to the point where it will no longer adhere to said element, whereupon the weight of the arms 35, 36 and the receptacle 39 will be sufficient to permit the parts to restore to the position of Fig. 1.

The arms 35, 36 carry closure plates 42 which are movable therewith to cover and uncover two of the opposed inlet ports 23 in the mixing chamber 21 and thus regulate the flow of air therethrough.

The enclosure 28 may be utilized to removably support, interiorly thereof, a waste receptacle 43 illustrated in detail in Figs. 9 to 15 and adapted to receive cotton or other waste which will be consumed by the flame of the burner. A bracket 44 mounted upon the interior wall of the enclosure 28 is so disposed that when the receptacle 43 is inserted, the latter will assume a diagonal position so that its lower end will be located in the flame from the burner whether the valve 26 is closed or opened. With the receptacle thus positioned and with a high flame burning, the receptacle will be heated to a high degree to consume the waste therein and heat radiating therefrom will also raise the temperature of the enclosure 28. This heat will be conducted to the base of the nozzle 22 and thence to the conducting rod 41, the free end of which is now immersed in the adhesive 40 which now softens gradually until it will no longer adhere to said rod, whereupon the valve mechanism restores to normal and the flame is reduced.

The form of burner shown in Figs. 5 to 7 comprises the usual mixing chamber 45 having the nozzle 46 extending upwardly therefrom and the flow of gas into said chamber is controlled by a rotating needle valve 47. In accordance with the present invention, a bracket 48 is secured to the chamber 45 and extends upwardly alongside the nozzle 46 to a point short of the upper end thereof where it has pivoted thereto a valve actuating member comprising an upper portion 49 and a lower portion 50. Said portion 49 extends upwardly beyond the nozzle outlet and has an enlargement 51 at its upper extremity for engagement by a test tube, for example, which may be utilized to rock the actuating member about its pivot while moving the tube to a position over the burner flame and which also may be employed to reverse the action of said member when withdrawing the tube.

The lower portion 50 of the valve actuating member is provided with a lateral extension 52 having rack teeth 53 engageable with the geared head 54 of the needle valve 47 so that when said actuating member is operated, said valve will be turned to open and closing positions to regulate the height of the burner flame. Said portion 50 is also provided with an arcuate closure 55 for controlling certain of the air inlet openings 56 in the mixing chamber 45.

In Fig. 8, the bracket 48 has mounted thereon a receptacle 57, similar to the receptacle 39, and containing a body 58 of suitable adhesive material. Said body is so located as to receive the free lower extremity of the curved heat conducting rod 59 secured to the upper portion 49 at a point adjacent the outlet of the nozzle 46 whereby said rod will be heated by the high flame emitting from said nozzle sufficiently to soften the body 58 after a definite lapse of time and thus release said rod from adhesive contact with said body. Thereupon, assuming that the valve actuating member is not held in its operative position by an implement being heated, a spring 60 joining the bracket 48 with the lower portion 50 of said member will restore the latter to normal and thus close the needle valve 47.

What is claimed is:

1. In a Bunsen burner, the combination with a mixing chamber, a nozzle extending therefrom, and a control valve for said chamber having open and closed positions for regulating the flame emitting from said nozzle; of a regulating device for said valve comprising an actuating member movably supported with respect to said nozzle for engagement by an implement to move the same, a connection between said actuating member and valve for adjusting the latter to open position when said member is moved in one direction, and means for retaining said valve in open position for a definite interval of time after the opening thereof, said means comprising a thermally releasable connection between the burner and the actuating member.

2. In a Bunsen burner, the combination with a mixing chamber, a nozzle extending therefrom, and a control valve for said chamber having open and closed positions for regulating the flame emitting from said nozzle; of a regulating device for said valve comprising an actuating member pivotally supported with respect to said nozzle and having at least a portion thereof extending above the nozzle for engagement by an implement to move the same, a connection between said actuating member and valve for adjusting the latter to open position when said member is moved in one direction, and means for retaining said valve in open position for a definite interval of time after the opening thereof, said means comprising a thermally releasable connection between the burner and the actuating member.

3. In a Bunsen burner, the combination with a mixing chamber, a nozzle extending therefrom, and a control valve for said chamber having open and closed positions for regulating the flame emitting from said nozzle; of a regulating device for said valve comprising an actuating member movably supported with respect to said nozzle for engagement by an implement to move the same, a connection between said actuating member and valve for adjusting the latter to open position when said member is moved in one direction, and means for retaining said valve in open position for a definite interval of time after the opening thereof, said means including a body of adhesive material supported adjacent said nozzle so as to be affected by the heat radiating therefrom, an element connected to said actuating member and adapted to be partially embedded in said body and retained therein when said valve is opened until said body is sufficiently softened by the heat from said nozzle to release said element to move said actuating member, and means for conveying heat from the flame of the burner to said element.

4. In a Bunsen burner, the combination with a mixing chamber, a nozzle extending therefrom, and a control valve for said chamber having open and closed positions for regulating the flame emitting from said nozzle; of a regulating device for said valve comprising an actuating member movably supported with respect to said nozzle for engagement by an implement to move the same, a connection between said actuating member and valve for adjusting the latter to open position when said member is moved in one direction, and means for retaining said valve in open position for a definite interval of time after the opening thereof, said means including a heat conducting element thermally mounted on said nozzle, and a body of adhesive material connected to and actuated by said connection, when said valve is opened, for movement into adhesive engagement with said heat conducting element and thereby to hold said connection in a position to maintain said valve in open position for a definite interval of time.

5. In a Bunsen burner, the combination with a mixing chamber having air intake openings, a nozzle extending from said chamber, and a control valve for said chamber having open and closed positions for regulating the flame emitting from said nozzle; of a regulating device for said valve comprising an actuating member movably supported with respect to said nozzle for engagement by an implement to move the same, a connection between said actuating member and valve for adjusting the latter to open position when said member is moved in one direction, a pair of arms pivotally supported on opposite sides of said nozzle operatively connected to said valve for pivotal movement when the latter is operated, said arms having closures for covering the air intake openings in said nozzle and movable to uncovering position when said valve is adjusted to open position, a body of adhesive carried by one of said arms, and a heat conducting element thermally mounted on said nozzle and adapted to be partially embedded in said adhesive body by the movement of the latter when said valve is adjusted to open position.

6. In a Bunsen burner, the combination with a mixing chamber, a nozzle extending therefrom, and a rotary control valve for said chamber having a geared head; of a regulating device for said valve comprising a control member pivotally connected to said burner and having one portion extending upwardly beyond the outlet end of said nozzle for engagement by an implement to rock said control member about its connection, said control member further comprising a lower portion terminating in a laterally extending rack engageable with said geared head for turning said valve when said control member is rocked about its pivot, and means for retaining said valve in an open position a definite interval of time after the opening thereof, said means including a body of adhesive material supported by said burner, and an element carried by the upper portion of said control member and movable therewith, when said valve is opened, so that a portion of said element will be embedded in said adhesive body.

7. In a Bunsen burner, the combination with a burner nozzle, an enclosure therefor, and a valve having open and closed positions for controlling the flow of combustible mixture from said nozzle; of a movable regulating device for said valve mounted on said enclosure and having connection to said valve for opening and closing the same, a heat radiating element supported on said enclosure in the path of the flame from said nozzle to heat said enclosure, a heat conducting element having thermal connection with said enclosure, and a thermally controlled body carried by said regulating device, said body including a meltable substance engageable by said heat conducting element to retain said regulating device in a position to hold said valve open, and being releasable to permit said regulating device to return to a position in which said valve is closed.

References Cited in the file of this patent

UNITED STATES PATENTS

| Number | Name | Date |
|---|---|---|
| 736,321 | Walther | Aug. 11, 1903 |
| 1,167,397 | Getson | Jan. 11, 1916 |
| 1,545,497 | Kener | July 14, 1925 |
| 1,670,209 | Pardon | May 15, 1928 |
| 1,697,524 | Epstein | Jan. 1, 1929 |
| 2,083,565 | Hothersall | June 15, 1937 |
| 2,128,059 | Siegert | Aug. 23, 1938 |
| 2,301,014 | Burklin | Nov. 3, 1942 |
| 2,433,142 | Moen | Dec. 23, 1947 |

FOREIGN PATENTS

| Number | Country | Date |
|---|---|---|
| 16,234 | Great Britain | of 1910 |
| 35,141 | Norway | Jan. 26, 1922 |